3,074,869
PHOTO-SENSITIVE COMPOSITIONS AND
ARTICLES THEREFROM
Wesley R. Workman, St. Paul, Minn., assignor to Minnesota Mining and Manufacturing Company, St. Paul, Minn., a corporation of Delaware
No Drawing. Filed Dec. 23, 1960, Ser. No. 77,795
20 Claims. (Cl. 204—158)

This invention relates to the polymerization of epoxy resins and more particularly to certain photo-sensitive oxirane-group containing compositions, to a process for rendering said oxirane-group compositions selectively insoluble, and to useful articles produced thereby.

The process and products of the invention involve curing of epoxy resin prepolymers, and as used herein, the term "curing" describes the gross change in physical properties of an epoxy resin prepolymer or mixture comprising such a prepolymer which is brought about by chain-extension and/or crosslinking and is usually characterized by decrease in solubility and increase in viscosity to a non-fusible condition.

The term "epoxy resin prepolymer" is herein used to refer collectively to curable oxirane-group containing compounds and polymers, mixtures of such materials and the like. Curability of these prepolymers appears to depend on the presence of an average content of more than one oxirane group per molecule. It is well known that useful compositions may be produced by subjecting epoxy resin prepolymers to the action of curing agents. An extensive series of such prepolymers and curing agents are known. Some typical examples of such prepolymers, which are often designated in the art simply as epoxy resins, are the glycidyl ethers of bis-phenol-A, aliphatic glycidyl ethers, glycidyl esters such as polyglycidyl methacrylate and bisepoxides such as vinylcyclohexene diepoxide. Other typical epoxy resins are described in Modern Plastics Encyclopedia Issue, vol. 35, No. 1A, p. 105 ff., September 1957.

The epoxy resin prepolymers have commonly been cured heretofore by employing, for example, acid anhydrides or amines as curing agents. The cure is ordinarily effected by heating a mixture of epoxy resin prepolymer and the curing agent for a suitable period of time at temperatures which may be well above 120° C., especially where acid anhydride curing agents are used. However, the cure is generally initiated immediately upon admixture of the curing agent and the prepolymer, and exothermic reactions may occur spontaneously which lead to rapid insolubilization and complete curing. Consequently, in most instances, after the addition of curing agent, the time during which the resulting reaction mixture can be manipulated at temperatures sufficiently elevated to maintain the viscosity within a useful low range, that is, the pot life, is quite short. This behavior of epoxy resin prepolymers makes them most suitable for use where only simple operations are to be performed after mixing with curing agents, as for example casting techniques such as formation of solid masses of resin in which objects are embedded. Thus, it has not been convenient heretofore to prepare epoxy resins in self-sustaining pellicular or thin molded form, except by casting operations requiring a mold and parting agents to prevent adhesion thereto. Because of the desirable mechanical properties, such as toughness, of the insoluble epoxy resins, the utility of epoxy resins in coatings has heretofore been recognized. However, the use of these resins in solution for providing coatings necessarily implies that ultimate insolubility is not achieved, so that the full potentialities of a completely cured epoxy resin are not realized.

It is an object of this invention to provide organic solvent-soluble compositions containing epoxy resin prepolymers, which become curable to thermosetting organic solvent-insoluble form after exposure to light. It is another object of the invention to provide sheet constructions containing epoxy resin prepolymers, which can be cured after exposure to actinic radiation. A further object of this invention is to provide sheet constructions containing epoxy resin prepolymers which are curable in areas where exposed to light so as to produce preselectively differentially cured articles. A still further object is to provide laminar articles consisting of a supporting surface and a cured epoxy resin in the form of raised indicia thereon. Other objects will become apparent from the disclosures hereinafter made.

In accordance with the above and other objects of the invention, it has been found that by admixing $\alpha,\beta$-unsaturated nitrosamines with a curable epoxy resin prepolymer, exposing this mixture to the action of actinic light and subsequently heating, there is produced an insoluble, cured epoxy resin. Broadly speaking, the nitrosamines which can be employed for this purpose are those compounds containing one or more N-nitrosoazapropenyl residues, having the structure

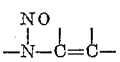

associated with non-interfering radicals or connecting groups. These photoactivatable curing agents may also be described as organic compounds containing at least one vinylnitrosamino group.

The $\alpha,\beta$-unsaturated nitrosamines preferred for use as photosensitive curing agents in the present invention are selected from the group consisting of compounds represented by the formulae:

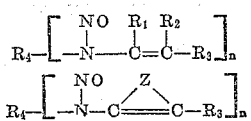

and

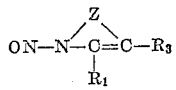

wherein $n$ is an integer selected from the group consisting of 1 and 2, $R_1$ is a member of the group consisting of hydrogen, alkyl radicals having less than 7 carbon atoms and cycloalkyl radicals having from 5 to 6 carbon atoms, $R_2$ and $R_3$ are individually members of the group consisting of hydrogen, alkyl and cycloalkyl radicals such that the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, in which radical any ethylenic unsaturation is at least 1 carbon atom removed from a valence position, and Z is a divalent alkylene (e.g. polymethylene) radical comprising the carbon atoms necessary to complete a ring having from 5 to 6 members.

When free radical initiating agents are added to the photoactivatable systems including vinylnitrosamines and epoxy resin prepolymers, the light and heat-sensitivity of these systems is increased.

I have also found that $\alpha,\beta$-saturated nitrosamines can be employed together with free radical initiating agents as photoactivatable curing agents for epoxy resin prepolymers. Thus, by admixing a curable epoxy resin prepolymer with a mixture of an $\alpha,\beta$-saturated nitrosamine and a free radical generating agent, exposing the mixture to actinic light and subsequently heating, there is produced an insoluble, cured epoxy resin.

Broadly speaking, the saturated nitrosamines which can be employed for the purpose are organic compounds containing one or more nitrosamino groups attached to saturated carbon atoms and associated with non-interfering radicals or connecting groups. The preferred saturated nitrosamines are chosen from the group consisting of compounds represented by the formulae:

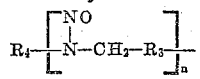

and

wherein $R_3$, $R_4$, Z and $n$ have the significance set forth hereinabove.

Thus the photoactivatable curing agents of the invention can be considered to be organic compounds containing one or more vinylnitrosamino groups, or mixtures of these with free radical initiators, or mixtures of organic compounds containing one or more $\alpha,\beta$-saturated nitrosamino groups with free radical initiators.

It has, moreover, been found that if the actinic light reaches the mixtures of epoxy resin prepolymer and curing agent through a masking screen, for example, a photographic negative, the resulting sheet, after heating and removal of the soluble uncured epoxy resin prepolymer by solvent action, gives a raised positive image of the masking screen employed, in that only the areas exposed to light are cured and become insoluble. If the mask employed is in the form of a negative of indicia such as letters or the spots of a half-tone illustration, the resulting positive can be employed for printing purposes as a printing plate. If the thickness of film formed is not great, i.e. less than 1 mil, and the backing is oleophobic, the printing plate is suitable for lithographic production. If, on the other hand, the film thickness is relatively great, of the order of 3 to 200 mils, the printing plate is suitable for letter press printing. It is thus possible to make a three dimensional molded form using only a two dimensional mask.

While photo-initiated polymerization has heretofore been known for ethylenically unsaturated monomers, such procedures have not heretofore been available for epoxy resin prepolymers. It was not to be expected that processes applicable to an ethylenically unsaturated monomer would apply to the epoxy resin prepolymers employed in the present process, in view of the completely different nature of the curing process in each case.

The exposed and cured areas of printing plates prepared by the process of the invention are not subject to swelling by solvents during the washing process, and accordingly such plates are dimensionally stable and are conveniently prepared using powerful solvents such as acetone to remove the organic solvent-soluble, uncured prepolymer.

The $\alpha,\beta$-unsaturated nitrosamines which are one class of the useful photo-activated curing agents in the process and products of the present invention may be considered in a broad sense to be derived from methyl vinylnitrosamine. They all possess the basic chain

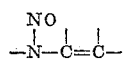

the N-nitroso-azapropenyl residue, alternatively termed the ethylenically $\alpha,\beta$-unsaturated nitrosamine group or vinylnitrosamine group, in which one of the valences of nitrogen is satisfied by a nitroso group. The $\alpha,\beta$-saturated nitrosamines used in the invention include compounds in which the nitrosamino group is attached only to saturated carbon atoms. Certain of the members of these series possess a plurality of such characteristic groups. For example, those bearing two N-nitroso-azapropenyl residues are illustrated by 1,2-bis(propenylnitrosamino)ethane.

Inasmuch as the nitrosamine group, attached to an ethylenically unsaturated carbon atom, i.e. to an $\alpha,\beta$-unsaturated carbon chain, or, attached to saturated carbon atoms when free radical initiators are used concomitantly, appears to be the significant and operative moiety of the photolytically activated curing agents of the invention, the presence of other and non-interfering substituents or connecting groups in the compounds employed is of secondary importance. However, such substituents may have an effect on solubility, ease of preparation, cost, etc. of the compounds.

Examples of suitable nitrosamines included in the above general formula

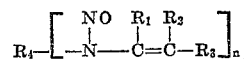

are methyl vinylnitrosamine, ethyl vinylnitrosamine, butyl vinylnitrosamine, octyl vinylnitrosamine, dodecyl vinylnitrosamine, allyl vinylnitrosamine, methallyl vinylnitrosamine, but-3-enyl nitrosamine, dec-9-enyl vinylnitrosamine, benzyl vinylnitrosamine, phenylbutyl vinylnitrosamine, cyclopentyl vinylnitrosamine, cyclohexyl vinylnitrosamine, ethyl propenylnitrosamine, allyl oct-1-enyl nitrosamine, benzyl propenylnitrosamine, cyclohexyl dec-1-enyl nitrosamine, phenylbutyl oct-1-enyl nitrosamine, oct-7-enyl-oct-1-enyl nitrosamine, ethyl 1-methyl propenylnitrosamine, phenylethyl oct-2-en-2-yl nitrosamine, methyl dec-4-en-4-yl nitrosamine, butyl 2-ethyl-but-1-enyl nitrosamine, 1,2-bis(propenylnitrosamino)ethane, 1,3-bis(1-methyl propenylnitrosamino)propane, 1,6-bis(2-methylpropenylnitrosamino)hexane, 1,4-bis(2-cyclohexyl vinylnitrosamino)-butane, 1,8-bis(2,2-dicyclohexyl vinylnitrosamino)-octane, 1,4-bis(1,2-dicyclohexylpropenyl-nitrosamino)-cyclohexane, 1,3-bis(cinylnitrosoaminomethyl)benzene, 1,2-bis(propenyl-nitrosoaminoethyl)benzene, 1,4-bis(2-methyl propenyl-nitrosoamino)cyclohexane, methyl $\beta$-styryl nitrosamino and the like.

In the above formulae, Z represents an alkylene (e.g. polymethylene) group possessing from 2 to 4 carbon atoms in a chain having terminal available valences such as, for example, the 1,2-ethylene, 1,3-propylene, 1,4-butylene, 2 methyl-1,3-propylene, 2-ethyl-1,3-butylene groups and other such groups possessing a total of not more than about 8 carbon atoms. Examples of nitrosoamines adapted to the purposes of the present invention having the general formula

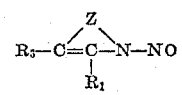

include N-nitroso-$\Delta^2$-tetrahydropyridine, 5-ethyl-6-methyl-N-nitroso-$\Delta^2$-tetrahydropyridine, N-nitroso-$\Delta^2$-dihydropyrrole, 2-methyl-N-nitroso-$\Delta^2$-tetrahydropyridine, 3-ethyl-N-nitroso-$\Delta^2$-tetrahydropyridine and the like.

Examples of nitrosamines useful for the purposes of the invention and having the general formula:

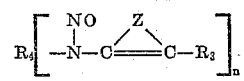

include methyl $\Delta^1$-cyclohexenyl nitrosamine, phenylethyl $\Delta^1$-cyclohexenyl nitrosamine, cyclohexyl $\Delta^1$-cyclopentenyl nitrosamine, butyl 2-methyl-$\Delta^1$-cyclophentenyl nitrosamine, 1,4-bis($\Delta^1$-cyclohexenyl nitrosamino)butane, 1,3-bis($\Delta^1$-cyclopentenyl nitrosoamino methyl) benzene and the like.

Examples of $\alpha,\beta$-saturated nitrosamines having the formula:

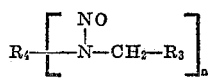

and

include dimethyl nitrosamine, methylcyclohexylnitrosamine, 1,4-bis(methylnitrosoamino)hexane, N-nitrosopiperidine, N-nitrosopyrrolidine, benzyl cyclohexylnitrosamine, hexyl allylnitrosoamine, benzyl isocrotonyl nitrosamine, methyl hexahydrobenzylnitrosamine, dibenzylnitrosamine, 1,2-bis(benzylnitrosoamino)ethane, 1,4-bis-(methylnitrosamino)cyclohexylene, 1,4-bis(ethyl nitrosoaminoethyl)benzene and the like.

It will be apparent that the photoactivatable curing agents employed in the process and products of the invention include organic compounds containing at least one vinylnitrosamino group, with or without the addition of a free radical initiator, and organic compounds containing at least one nitrosamino group attached only to saturated carbon atoms, with a free radical initiator. The latent curing agents of course should not have had any substantial exposure to actinic light. Such latent curing agents can be considered to contain photoactivatable nitrosamino groups which in the case of the nitrosamine groups attached to saturated carbons are made photoactivatable by the presence of the free radical initiator. These latent curing agents accordingly contain at least enough free radical initiator to render the nitrosamino group photoactivatable.

Broadly speaking, in practicing the invention, compositions are prepared containing in admixture about 0.01 to about 4 stoichiometric equivalents of the selected curing agent (based on the nitrosamine groups) for every mole equivalent of oxirane groups present in the epoxy resin prepolymer to be cured. When free radical initiators are employed they are added to the polymerization mixture in approximately molar equivalent amounts based on the amount of nitrosamino groups. The resulting mixture is preferably stirred or agitated to disperse the curing agent substantially uniformly therein.

Any suitable inert solvent can be used, if desired, to produce a liquid mixture if the selected epoxy compound is a solid. Thereafter, the compositions can be preserved until required, without change, as long as they are not exposed to light. If desired, the solution of a solid resin prepolymer can be cast on a support, with subsequent evaporation of the solvent, to form a dry, laminated sheet or film construction.

The compositions or articles of manufacture embodying them are handled and stored in subdued light or darkness until they are to be cured. When curing is to take place, the compositions are subjected to actinic light for an effective length of time. The cure is thus initiated, and by heating for a period of about 3 minutes upwards to as much as 3 days, at a temperature ranging upwards to about 150° C., the epoxy resin prepolymer is cured to a hard mass which is substantially insoluble in any solvent. The desired effect of the actinic light appears to be a "photolytic action," by which term is meant that exposure to actinic radiation which is sufficient to effect photolytic decomposition of the nitrosamine groups in the curing agents at the existing concentration. The photolytic curing agents of the invention appear to exhibit their maximum sensitivity in the ultraviolet range, and the source of actinic radiation should therefore have its maximum output in this spectral area. The decomposition products which are formed are not accurately known but are presently believed to comprise at least some secondary amine and possibly a Schiffs-base. (See C. H. Bamford, J. Chem. Soc. (London) 1939, 12.)

The exact duration of exposure to actinic light which is effective to initiate curing will obviously depend on a number of variable factors, such as the film thickness, light intensity, the distance of the light from the curable composition and the like. It will be apparent that the time required to achieve substantially complete photolytic action also will vary depending upon the thickness of the layer and the concentration of the $\alpha,\beta$-unsaturated or saturated nitrosamino, together with added free radical initiator, employed in any particular case. Thus, with a relatively thin layer, so that absorption by the prepolymer is nominal, while at the same time little nitrosamine is present, only brief exposure will be necessary; whereas with thicker layers and greater nitrosamine content longer exposures will be required.

In the accompanying examples it will be apparent how exposure time is selected to effect photolytic action, but obviously no absolute value of duration or intensity can be set forth without qualification as to film thickness, absorption characteristics and the like. Test exposures of samples of the curable compositions offer the most convenient means for establishing the conditions required. Generally, it is preferable to overexpose rather than underexpose since in most cases full cure of all resin in exposed areas is desirable.

The photolytic curing agents for epoxy resin prepolymers used in the process of this invention are incapable of initiating a cure in the mixture containing prepolymer at temperatures below their thermal decomposition point until acted on by actinic radiation. Thus, they may be regarded as latent curing agents. The catalytic action of the nitrosamine agents after irradiation with light is relatively rapid, so that the curing-time at 90° C., which would ordinarily require over 24 hours in the case of a mixture of an epoxy resin prepolymer and a previously known curing agent such as adipyl dihydrazide, is reduced to less than 3 hours when the same resin is cured with an $\alpha,\beta$-unsaturated nitrosamine of the invention, and even shorter periods when free radical initiators are added. Similarly, the curing time at higher or lower temperatures is likewise relatively shortened. This reduction in curing time can be of advantage where it is desired to apply a thin coating of an epoxy resin prepolymer, e.g. as a varnish, and the subsequent heating operation must be carefully controlled, for example, in application to a thermoplastic material.

The free radical initiators employed in the process and products of the invention are chemical free radical initiators exemplified by the organic peroxides and azo compounds. Included within the compounds which can be used are such materials as $\alpha,\alpha'$-azo-bis-isobutyronitrile, $\alpha,\alpha'$-azo-bis-methyl isobutyrate, dicumyl peroxide, benzoylperoxide, cumene hydroperoxide and the like. While actinic light is ordinarily also considered to be a type of free radical initiator in the broadest sense of the term, it is of course not included within the scope of this definition for the purposes of the present invention.

Exposure of the soluble epoxy resin prepolymer-curing agent mixture to actinic radiation, followed by curing, produces solid, thermoset, insoluble plastics. Thus, exposure of only a portion of the mixture will bring about a latent cure only in these areas; and if the mixture is a solid or semi-solid sheet, stencils or printing plates may be made by heat-curing, followed by removal of soluble uncured portions by washing with a suitable solvent. Where strong relief is desired, the source of actinic light should be substantially a point source located at 90° to the sheet; but it is obvious that the direction of illumination is not critical if it is not desired to produce a greatly raised relief image in the resulting polymer. The exposure through a negative can, however, furnish not only printing plates but it can give fully cured epoxy resin sheets and coatings having thereon a relief pattern of desirable ornamental form. For example, by applying an ornamental coating in this manner to a solid base of contrasting color, it is possible to achieve a cameo effect. Metallic, plastic and ceramic tile for walls can thus be fabricated with coatings having suitable patterns in relief without the expense of molding each one separately. The ornamental coating may contain suspended or dissolved coloring or tinting agents, so long as these do not effectively absorb the actinic radiation.

The $\alpha,\beta$-unsaturated nitrosamines employed in the practice of this invention are readily prepared by nitrosation of the corresponding $\beta$-haloamines followed by dehydrohalogenation. The requisite $\beta$-haloamines are available by reaction of β-hydroxyamines with a halogenating agent such as thionyl chloride, phosphorus pentachloride, phosphorus oxychloride or the like. This sequence of reactions is illustrated by the preparation of methylvinylnitrosamine, according to the following reaction scheme:

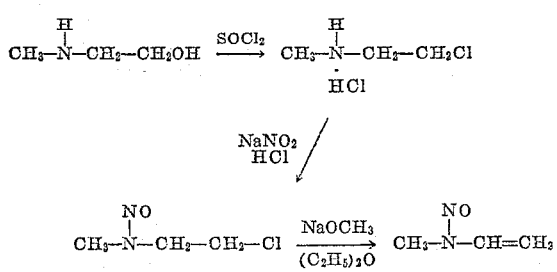

Similar sequences apply to other α,β-unsaturated nitrosamines.

A typical preparation of benzylvinylnitrosamine in which parts are by weight exemplifies the general procedure.

In a flask fitted with motor driven stirrer, condenser and addition funnel are placed 393 parts (3.3 moles) of a practical grade thionyl chloride and to it are added slowly and with stirring 151 parts (1.0 mole) of benzylethanolamine. After stirring about 4 hours, during which time an exothermic reaction takes place, excess thionyl chloride is removed by distillation under reduced pressure and the residual benzyl β-chloroethylamine hydrochloride is recrystallized from 95 percent ethanol, giving white, water-soluble, crystals melting at 190.5°–191° C.

*Analysis.*—Calc. for $C_9H_{12}NCl \cdot HCl$, percent N=6.8; percent Cl=34.4. Found: percent N=6.8; percent Cl=33.9.

An ice cold aqueous solution of 43.7 parts (0.21 mole) of the benzyl β-chloroethylamine hydrochloride thus prepared in 200 parts of water and 12 parts of concentrated hydrochloric acid is nitrosated by adding thereto a solution of 21 parts (0.3 mole) of sodium nitrite in 100 parts of water at such a rate that the temperature of the reaction mixture is maintained at less than 10° C. by an external ice bath. The total length of time required is about 1 hour. During the addition a yellow colored liquid separates, and stirring is continued for 30 minutes after the addition is complete. The N-nitroso benzyl β-chloroethylamine formed in the reaction is collected by extraction with ether, and the ethereal solution is dried.

Dehydrohalogenation is effected by reacting the ethereal solution of N-nitrosobenzyl-β-chloroethylamine with 11.5 parts (0.2 mole) of sodium methoxide with cooling for about 8 days, followed by extraction of inorganic salts with water and evaporation of the dried ethereal solution. The resultant benzyl vinylnitrosamine is a liquid having $n_D^{25}=1.5727$; λ max. at 2760 A; ε=7200, which decomposes on heating. The benzylvinylnitrosamine thus prepared is suitable for use as a curing agent without further purification.

*Analysis.*—Calc. for $C_9H_{10}N_2O$, 66.7 percent C, 6.2 percent H. Found: 67.4 percent C, 5.9 percent H.

This method is of general applicability to the production of α,β-unsaturated nitrosamines of this invention such as octenylvinylnitrosamine, methylvinylnitrosamine and methyl Δ¹-cyclohexenyl-1 nitrosamine. In analogous manner 3-hydroxypiperidine is converted to 3-chloropiperidine hydrochloride which is nitrosated and dehydrohalogenated as above, to form N-nitroso-Δ²-tetrahydropyridine.

Reaction of N,N′-di-(β-hydroxyethyl) ethylenediamine dihydrochloride with phosphorous pentachloride suspended in phosphorus oxychloride furnishes N,N′-di(β-chloroethyl)ethylenediamine dihydrochloride (M.P. 212–214° C.) which is nitrosated by the general method described to give N,N′-dinitroso-N,N′-di(β-chloroethyl) ethylenediamine, a light yellow colored solid soluble in benzene, melting at 53–53.5° C., λ max. 2360 A. ε=10,800.

*Analysis.*—Calc. for $C_6H_{12}N_4O_2Cl_2$, 29.6 percent C, 4.9 percent H. Found: 29.6 percent C, 5.0 percent H.

Dehydrohalogenation of the above method yields N,N′-dinitroso-N,N′-divinyl ethylenediamine as a yellow colored solid melting 87–88° C. λ max. 2730 A. ε=13,400.

*Analysis.*—Calc. for $C_6H_{10}N_4O_2$, 42.3 percent C, 5.9 percent H. Found: 42.5 percent C, 5.9 percent H.

In another aspect the scope of the invention includes a useful process for preparing α,β-propenylnitrosamines from the corresponding allyl nitrosamines. The preparation of certain of the nitrosamine curing agents of the present invention has been found to be effected by rearrangement of the β, γ-double bond of an allylnitrosamine to the α,β-position by the action of a base, to produce the corresponding α,β-propenylnitrosamine. The process is illustrated by the following general equation:

wherein $R_4$ and $n$ have the same significance as herein above.

The rearrangement is effected at a temperature in the range of about 10° to 100° C. by the action of at least about 0.5 mole of base for each mole of allylnitrosamine, up to a several-fold excess of base. The reaction is carried out in suitable inert organic solvent solution, and higher base concentrations appear to accelerate the reaction and to increase the yield.

The base employed is a strong base, such as an alkali metal alkoxide, for example, sodium hydroxide or ethoxide in ethanol or mixtures of anhydrous ether and ethanol, potassium isopropoxide in isopropanol and the like.

The process is more specifically illustrated by the following procedure for the preparation of propenyldecylnitrosamine:

A solution of 11.3 parts (0.05 mole) of allyldecylnitrosamine (prepared by nitrosation of the amine) in 22 parts of 95 percent ethanol containing 1.3 parts (0.055 mole) of sodium is permitted to stand at room temperature for about 3 days. The reaction mixture is cautiously treated with 25 parts of water and the ethanol is removed by distillation. The acidified residue is extracted with ether and the crude propenyldecylnitrosamine is isolated as a red colored liquid which is not distillable, having $n_D^{25}=1.4757$, λ max. 2810 A., ε=7000.

*Analysis.*—Calc. for $C_{13}H_{26}N_2O$, 12.4 percent N. Found: 11.9 percent N.

Methyl, allyl and tert-butyl propenylnitrosamines, 1,6-bis(propenylnitrosamino) hexane and 1,4-bis(propenylnitrosaminomethyl)-benzene are likewise prepared by this method from the corresponding methyl, allyl and tert-butyl allylnitrosamines, 1,6-bis(allylnitrosamino) hexane and 1,4-bis(allylnitrosaminomethyl) benzene, respectively.

The α,β-saturated nitrosamines are prepared by known processes for nitrosation of secondary amines using nitrous acid.

Owing to the fact that the curing of the prepolymers according to the invention takes place in connection with the oxirane group, great latitude in the choice of epoxy resin prepolymers is possible. Preferably, the prepolymer should be substantially free from groups or additives which strongly absorb light in the range of about 3200 to 4000 A., such as quinones. In general, it is preferred to use epoxy resin prepolymers either alone or in mixtures which are not tacky or soft before curing. However, by using a transparent removable protective sheet between the prepolymer composition and the negative, even liquid epoxy resin prepolymers can be used. The prepolymer may be selected for desirable properties, such as hardness, color, electrical characteristics and the like which are desired in the cured material, and the curable compositions can be modified as by the incorporation therein of finely divided preformed polymers or inert fillers which do not adversely absorb or reflect light in the range of 3200 to 4000 A., so as to prevent irradiation of the curing agent, or cure epoxy resin prepolymers spontaneously. Such additives can be termed "non-screening" or "inert" additives. Suitable epoxy resin prepolymers for use in the compositions of the invention include, for example, the diglycidyl ethers of 4,4'-dihydroxydiphenylpropane(bis-phenol-A) having the general formula:

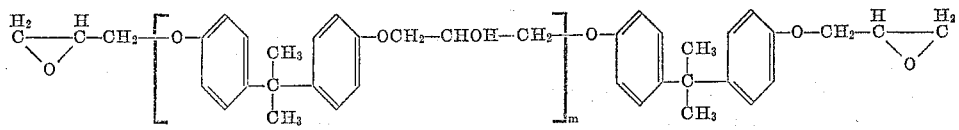

wherein m is 0, 1, 2 and up to about 20. Since such materials commonly are available as mixtures of substances having different integral values of m, the value may be expressed as an average value which is fractional. Other epoxy resin prepolymers in which the two glycidyl groups are joined solely by aliphatic linkages comprising glyceryl groups and diethylene glycol residues are also suitable, as well as those in which there are other linkages such as the diepoxide of vinyl cyclohexene. An epoxy resin prepolymer having the above general formula in which m has an average value about 0.3 is available commercially under the trademark name "Epon 828," while a prepolymer likewise having the same general formula, available under the trademark name "Epon 1001" having a softening point of about 64-76° and in which m is about 2, is also suitable.

The organic solvents in which the uncured coating materials are dissolved for preparations of films or for removal of unexposed and uncured prepolymer are those known to be useful for the purpose. They include acetone and dioxane as well as other ketones such as methylethylketone, diethyl ketone and the like; ethers, such as diethyl ether, diisopropyl ether, tetrahydrofuran, etc.; esters, for example, ethyl acetate, amyl acetate and the like; methylene chloride, chloroform, xylene, and like inert organic resin solvents, i.e. those which dissolve but do not react with epoxy resin prepolymers. For specific applications, factors of solvent power, volatility and reactivity are obviously to be taken into account.

The coating operation can be performed from solution, by coating a melted material or by painting, brushing or dipping, depending upon which method offers most advantages for a particular use.

The times of exposure herein employed will show the conditions required. Since this reaction is one which goes to completion it is usually preferable to overexpose when there is uncertainty since all of the exposed area is cured in the heating cycle whereas unexposed or only slightly exposed areas are subsequently removed by the solvent washing. Test exposures of portions of the curable mixture are the most convenient means of establishing needed minimum conditions.

The heating step of the process whereby the photosensitized curing of the epoxy resin prepolymer is carried to completion is ordinarily carried out at temperatures in the range of about 50° C to 150° C. For example, when volatile α,β-unsaturated nitrosamines are employed, dissolved in thin layers of epoxy resin prepolymer, the heating cycle can be carried out in a relatively short time by heating at about 140–150° C., if desired. In other cases, heating is carried out at a temperature below the thermal decomposition point of the selected α,β-unsaturated or saturated nitrosamine, which temperature of heating may be as low as about 50° C. Conveniently and preferably a temperature in the range of about 80° to about 120° C. is employed. The heating cycle can be carried out separately or can be carried on substantially simultaneously with the exposure cycle by means of circulated hot air, a heated platen in back of the plate or other such means. This serves to shorten the processing time.

The compositions of the invention, the articles of manufacture produced therefrom and the processes for their preparation are specifically illustrated in the following examples, which are not to be construed in any sense as limiting, but rather as indicative of the scope thereof. All parts are by weight unless otherwise specified.

*Example 1*

A 10 percent solution of methylvinylnitrosamine in an epoxy resin prepolymer (a liquid resin in which m as used in the general formula set forth hereinabove averages about 0.3, available under the designation ERL 2774) is prepared by mixing 1 part of the nitrosamine with 10 parts of the resin. The mixing and manipulation of the resulting composition are carried out in subdued yellow light. The resulting homogeneous viscous solution is divided into four substantially equal parts, and each part is cast into a specimen layer about 40 mils thick on glass. Two of the specimens are exposed in a 40 mil thick layer for 1 hour at 8 inches distance, to the light from a high pressure mercury vapor lamp which produces a high intensity of ultra-violet light and has substantial emission in the region of about 3200 to 4000 A. (Such a lamp is available under the designation "B–H6" from the General Electric Company.) The remaining two specimens are not exposed to the light. One of each of the exposed and unexposed materials is allowed to stand at 25° C.; the other two specimens are heated at 90° C. At 25° C. neither specimen hardens after standing 2 days, although the specimen exposed to light will be found to show some increase in viscosity after 2 days, the unexposed part is not significantly altered even after standing 60 days at 25° C., and the corresponding specimen kept at 90° C. is still liquid after 2 days. The exposed specimen which is heated at 90° C. becomes hard within 5 hours, thus showing the photosensitized latency of cure.

In the above example the ratio of moles of methylvinyl nitrosamine:epoxy equivalent is about 0.23:1. Solutions of methylvinyl nitrosamine in the above epoxy resin prepolymer at concentrations of 0.01, 0.02 and 4.0 moles of methylvinyl nitrosamine per mole of epoxy equivalent are prepared, placed in sealed containers to prevent loss by evaporation and exposed to the light from a B–H6 lamp at a distance of 6 inches for 1, 1 and 2 hours, respectively. The last time period is larger because of the high concentration of nitrosamine. After exposure, the respective containers and contents are heated at 90° C. for 72 hours. It is found that at the 4.0:1 ratio the prepolymer has cured to a viscous liquid which is insoluble in acetone, at the 0.02:1 ratio the cure is to a hard solid and at the 0.01:1 ratio the prepolymer has become a soft solid.

A 10 percent solution of allyl propenylnitrosamine in a liquid bisphenol A-glycidyl ether resin prepolymer available commercially under the trademark name "Epon 828" has similar photosensitive curing properties under similar conditions. Thus, solutions of 1.0 part (0.16 mole) of the nitrosamine in 10.0 parts (1 molar equivalent) of the resin are prepared in subdued light, spread to 40 mil thickness and divided into two non-illuminated controls, and two exposure specimens. The latter are exposed as above to an ultraviolet-producing lamp for 1 hour. Each specimen is then heated at 90° C., whereupon the exposed samples are cured to a hard insoluble resin after 20 hours, while the controls remain solvent-soluble liquids.

In the case where no free radical initiator is present, the specificity of the $\alpha,\beta$-unsaturation in the nitrosamine molecule for the photoactivated curing of epoxy resins is readily demonstrated as follows: allyldecylnitrosamine, dimethylnitrosamine, dimethallylnitrosamine and dibenzylnitrosamine are prepared as 10 percent solutions in a liquid bisphenol-A-glycidyl ether resin prepolymer, cast into 40 mil films and irradiated as set forth hereinabove. It will be noted that all of these compounds lack the $\alpha,\beta$-ethylenic unsaturation characteristic of the nitrosamines employed in this invention. All of the films thus prepared fail to harden on heating, thus showing these compounds to be inactive as photosensitized agents for curing epoxy resin prepolymers.

In another series of illustrative compositions, it is found that ten percent by weight solutions (about 0.1:1 molar ratio) of octenylvinylnitrosamine and decylpropenylnitrosamine in the liquid epoxy resin prepolymer designated as "ERL 2774" show definitely photocatalyzed curing after irradiating as above described followed by heating 48 hours at 90° C., while like solutions of methyl $\Delta^1$-cyclohexenyl-1 nitrosamine and benzylvinylnitrosamine in this prepolymer, similarly treated, cure to a hard solid in less than 48 hours. Likewise, solutions of 1-nitroso-$\Delta^2$-tetrahydropyridine, 1,2-bis(vinylnitrosamino) ethane, 1,6-bis(propenylnitrosamino) hexane and 1,4-bis-(propenylnitrosoaminomethyl)-benzene in the same prepolymer become solid after irradiating with an ultraviolet lamp as set forth above and heating at 90° C. for less than 24 hours.

Illustrative of systems containing free radical initiators and both $\alpha,\beta$-unsaturated and $\alpha,\beta$-saturated nitrosamines is the following:

Solutions containing about 10 mole percent of dimethylnitrosamine in the liquid epoxy resin designated as "ERL-2774" and an amount of $\alpha,\alpha'$-azo-bisisobutyronitrile equivalent to the dimethylnitrosamine are irradiated for 1 hour as above described, and then heated 76 hours at 90° C. in an oven. The mixture sets to a hard resin. Similar solutions in which no free radical initiator is present, and which are irradiated and heated in the same way for 96 hours remained uncured.

Solutions containing equivalent molar amounts of the above "ERL-2774," $\alpha,\beta$-unsaturated nitrosamine and $\alpha,\alpha'$-azo-bis (isobutyronitrile) are prepared using respectively methylvinyl nitrosamine and benzyl vinyl nitrosamine. These are irradiated for one hour at a distance of 15 cm. by an ultraviolet-producing lamp and are then heated at 90° C. for about 16 hours to a cured hard resin. In comparable tests in which the free radical initiator is omitted, times to cure are about three times as long.

When dicumyl peroxide is employed in place of azobisisobutyronitrile in the above procedures substantially similar results are obtained and the resin cures to a hard state on heating.

Another type of epoxy resin prepolymer, which is exemplified by polyglycidyl methacrylate, has been found to be particularly useful in the process of this invention. These epoxy resin prepolymers are ethylenic polymers of glycidyl methacrylate, glycidyl acrylate or the like, in which substantially all of the ethylenic unsaturation has been satisfied by a free radical polymerization process, for example, using $\alpha,\alpha'$-azobis-isobutyronitrile as the initiator to give a solid ethylenic polymer. It is to be noted that such substances are simultaneously epoxy resin prepolymers and ethylenic polymers, the latter term to avoid possible confusion being employed herein to designate polymers formed by the polymerization of ethylenic unsaturation. Polyglycidyl methacrylate is produced by heating a solution consisting of 200 parts glycidyl methacrylate, 500 parts acetone and 2.5 parts $\alpha,\alpha'$-azobis- isobutyronitrile at 50° C. for 3-4 days. This solution is contained in a vessel from which oxygen has been displaced by nitrogen. Isolation of the ethylenic polymer is accomplished by distillation of the acetone or by precipitating the solid in a liquid miscible with acetone but in which the ethylenic polymer is insoluble, such as methanol or water. The polyglycidyl methacrylate thus prepared has inherent viscosity in dioxane of about 0.30. This solid ethylenic, epoxy group-containing polymer can be applied to a support by warming and knifecoating or by casting a solution, for example in dioxane, and drying. The coating is hard, non-tacky, glossy, colorless and transparent but is soluble in solvents such as dioxane, acetone, ethyl acetate, chloroform, etc.

It has been found that as much as 50 percent by weight of nitrosamine of this invention is readily incorporated into such a coating formed from a solution by adding the nitrosamine to the solution before the film is prepared. The nitrosamine does not interfere with the casting operation nor does it alter the properties of the resultant coating other than to impart a faint color. The coating is not tacky and such coatings are stable and remain useful in the process of this invention for long periods when stored under conditions in which they are not exposed to light or to temperatures above 50° C. for extended periods of time.

The preparation of a plate suitable for letter-press printing, using polyglycidyl methacrylate as the film-forming epoxy resin prepolymer, is illustrated in the following example:

*Example 2*

A solution of 20.0 parts (1 mole oxirane equivalent) of polyglycidyl methacrylate and 6.0 parts (0.5 mole) of methylvinylnitrosamine in 40 parts of dioxane is applied to a 5 mil thick sheet of silicated aluminum (prepared by the method of U.S. Patent 2,714,066) so that on drying a layer about 2 to 3 mils thick remains. The plate is dried under light and dust-excluding conditions with care to avoid too rapid drying which might result in blushing.

A half-tone negative of about 125 lines per inch is applied emulsion-side up to the dry plate without interposition of any membrane and then the plate is exposed to light through the negative in an illuminating apparatus. (Such apparatus can be obtained commercially under the trademark name "Dial-A-Plate" from Robertson Photo-Mechanix, Inc.) In the apparatus an ultraviolet producing lamp designated as "General Electric S-1," and provided with a reflector is located about 18 inches from the plate position. The negative is pressed against the plate by a vacuum frame and window glass cover. Exposure time is controlled by a photoelectric cell so that variations in line voltage and age of the light bulb have no effect on the exposure. In this apparatus a normal commercially available lithographic plate requires about 12 units of illumination. The plate of the present invention requires about six times as long (72 units). After this exposure, the plate is heated at 140° C. for three minutes. Although this temperature is above the ordinary thermal decomposition temperature of methylvinylnitrosamine, decomposition is not observed when the coating is less than about 5 mils thick. Heating at 120° C. for 15 minutes is an equally satisfactory method of curing after exposure.

After exposure and heating the plate is immersed in acetone to remove prepolymer and dried. Vigorous washing or scrubbing which may result in loss of detail or damage to the form of characters is unnecessary because of the ready solubility of the prepolymer in this solvent. If desired, the material removed by washing can be reclaimed from the solution. The plate thus prepared is satisfactory as a dry offset plate and after affixing it to a block by means of double-coated pressure sensitive adhesive tape to give standard thickness, it can be employed for printing by letter press procedure in the same way as an etched plate is employed. The prints obtained show excellent tonal gradation because of the accurate reproduction by this method of the dot sizes present in the original half-tone negative. Line copy is reproduced in the same manner, but if desired a somewhat thicker coating of about 20 to about 250 mils can be used.

It is one of the advantages of the compositions of this invention that firm coatings can be employed which possess no appreciable fluidity and are not tacky. This permits direct contact between the coating and a negative with subsequent separation and also permits illumination in positions other than horizontal. When reproducing half-tones as set forth herein there is a further advantage in the plates of the invention, namely that of dispensing with a separator membrane, in that the closer the negative is to the coating being exposed, the less the distortion in size of individual dots that occurs as diffusion or as the result of parallax owing to non-normal illumination. The result is a particularly faithful reproduction of half-tone dots.

*Example 3*

This example illustrates the preparation of a printing plate using line copy, that is, a negative of printed matter including letters, numbers, and other indicia.

A sheet of polyethylene terephthalate is spread out flat and a metal frame defining a rectangular area is placed thereon. A solution of 6.5 parts (1 mole epoxy equivalent) of polyglycidyl methacrylate and 1.8 parts (0.5 mole) of 1,2-bis (vinylnitrosamino)-ethane in 40 parts of dioxane is poured onto the sheet so that the area included in the metal frame is filled to a depth of about 40 mils. The solution is allowed to dry in the dark at about 23° C. to a tack-free coating and the metallic frame is removed, whereupon a flexible plate consisting of a 5 mil thick polyethylene terephthalate backing or support lamina having a 5 mil thick coating is obtained.

A line copy negative is placed emulsion side up directly on the coating of the plate and held in place by a sheet of glass. The sandwich is exposed for 5 minutes to the light from a "B-H6" ultraviolet lamp at a distance of 4 inches. One such lamp at this distance is a suitable illuminating means for an area of about 25 square inches of plate, while for larger areas a suitable bank of such lights is more convenient and by this means also the exposure time can be reduced.

It is to be noted that whether the negative is placed with emulsion side up or down is determined by the method of printing to be employed. Since letter-press prints directly on paper, the positive for this purpose should be reversed and the negative is placed emulsion side up. For lithography and offset printing the positive print has the form to be read in the printed copy.

The exposed plate is heated at 120° C. for 15 minutes to "fix" the illuminated portions of the image by photocatalyzed nitrosamine-effected cure of the epoxy resin prepolymer. The fixed plate is immersed in acetone to dissolve and thus remove uncured polyglycidyl methacrylate in the shaded areas, leaving a plate which is dried at room temperature. The indicia appearing on the plate have a height of about 5 mils above the backing. (For indicia of this height the buttressing of the sides described in U.S. Patent 2,760,863 is not essential but, if desired, this can be provided by applying the techniques of illumination described therein.) The plate prepared by this means is found to give good reproduction of the printed text when printed on a horizontal flat bed press.

The method of this example can also be used for the preparation of half-tone plates or combinations. It is thus possible to compose an entire page including illustrations and prepare a single plate therefrom. Such plates are readily adaptable to printing on either flat-bed or rotary presses. Negatives can be used in the composing, mounted on a suitable transparent backing, interstices between pieces blackened, for example, with India ink, and a plate then prepared directly. The common technique of mocking up pages and then photographing can also be employed. Photographic typesetting apparatus of the various known types is a suitable source for negatives from which plates can be conveniently prepared as described in the present examples.

One of the advantages of using a transparent backing or support such as a sheet of polyethylene terephthalate is that the sandwich consisting of holding cover, negative and plate may rest on a black pad thereby minimizing reflections which tend to cause unsharp images. This is in effect an antihalation pad. Coatings having this same effect can also be applied to metallic backings and other reflective backings such as white paper. It is also possible to use a black paper backing when a plate is desired for relatively few impressions.

The following example illustrates the use of an antihalation treatment.

*Example 4*

A sheet of aluminum is "alodized" (that is, treated with a commercially available proprietary preparation sold as Alodine 1200 by American Chemical Paint Co. and which is believed to comprise chromic acid) to form a brown surface effective as an antihalation coating. A hot mixture (about 100° C.) of 5 parts (1 mole epoxy equivalent) of a high molecular weight epoxy resin prepolymer (epoxy equivalent weight about 1000) in which $m$ of the above general formula is about 5 and having a softening point of about 100° C. (available under the trademark name "Bakelite resin EKRD 2003"), 2.7 parts of a solid acid-terminated polyester (equivalent weight 530) from isosebacic acid, ethylene glycol and glycerol, and 0.5 part (1.2 moles) of methylnitrosamine is knife-coated under conditions of subdued illumination to a uniform thickness of about 10 to 15 mils on the "alodized" aluminum sheet. A transparent negative is applied and exposure of the plate effected in the same way as in the previous example except that the light is at a distance of about 6 inches and exposure is continued for 30 minutes. The image is fixed at 110° C. for one hour and uncured prepolymer mixture is removed by immersion in acetone. The resultant plate has indicia thereon of a height equal to the original thickness of the coating. It prints very satisfactorily on paper when inked with a roller. It is also suitable for letter press printing.

The thickness of the coating which is necessary for letter-press printing increases with the amount of blank space in the printed matter. The presence in the copy of large areas of white space, such as would require routing in an etched plate, requires that the plates of the invention have thicker coatings, up to about 250 mils. However, for lithographic plates only very thin coatings are necessary, as is described in the following example.

*Example 5*

A silicated aluminum plate (prepared by the method of U.S. Patent 2,714,066) is coated with a layer of photosensitive epoxy resin prepolymer less than 1 mil thick by flowing on and draining off under a subdued yellowish light the excess of a solution of 1.5 parts of polyglycidyl methacrylate, 1.5 parts of an epoxy resin prepolymer, "Bakelite resin EKRD 2003" and 0.9 part of methylvinylnitrosamine in 7 parts of dioxane. The stoichiometric ratio in this case is about 0.91 mole nitrosamine per mole of epoxy equivalent. Residual solvent evaporates in a short time on standing, and the plate is then ready for exposure.

Exposure through a negative transparency is carried out with the apparatus described in Example 2, using 36 units of exposure. Curing of exposed areas is effected by heating at 100° C. for about 3 minutes and unexposed areas are freed from the coating by merely rubbing the plate with a cloth soaked in acetone until the uncured prepolymer is removed. The exposed and therefore acetone-insoluble resin areas are ink-receptive, while the areas in which the silicated surface of the plate is exposed owing to removal of prepolymer are water-receptive. Printing is successfully carried out on a commercial lithographic press.

When a lithographic plate is being prepared as in this example there is no great necessity for an antihalation coating and this is even somewhat undesirable, insofar as the reflected light which would be absorbed by such a coating may otherwise reduce the exposure time slightly. Because of the thinness of the coating for lithographic purposes there is very little absorption of the actinic wavelengths which are primarily absorbed by the $\alpha,\beta$-unsaturated nitrosamine. In thicker coatings, and particularly those in which a high concentration of $\alpha,\beta$-unsaturated nitrosamine is employed, absorption of the actinic wavelengths may become sufficiently pronounced so that exposure near the base of the coating does not occur until at least partial photolysis of the upper portions has occurred, with resultant change in absorption characteristics. In view of this fact, times of exposure may become very long for thick coatings and it is preferred that such thick coatings be prepared from compositions which contain relatively low proportions, viz catalytic amounts, of the $\alpha,\beta$-unsaturated nitrosamines.

*Example 6*

When a solution of 20.0 parts (1 epoxy equivalent) polyglycidyl methacrylate and 2.0 parts (0.134 mole) of 1,4-bis (vinylnitrosamino) cyclohexane in 45 parts dioxane is flowed on a 5 mil thick sheet of silicated aluminum and allowed to drain under subdued yellowish light, the solvent evaporates after about 15 minutes leaving a photosensitive coating less than 1 mil thick. This plate is exposed for about 100 time units through a negative transparency using the apparatus described in Example 2 and is then heated to cure the exposed areas for about 10 minutes at 105° C. Unexposed areas are freed from prepolymer by rubbing the plate with a cloth soaked in ethyl acetate until no more prepolymer is dissolved. The plate is suitable for lithographic printing, exposed areas of insoluble polymer being ink-receptive.

In the same manner lithographic plates are prepared in which the N-nitrosoazopropenyl residue is provided by but-3-enyl vinylnitrosamine, butyl 2-ethyl-but-1-enyl nitrosamine, benzyl propenyl nitrosamine, cyclohexyl propenyl nitrosamine and methyl 2-methylpropenyl nitrosamine. These plates likewise are satisfactory for printing.

When the equivalent amount of azobisisobutyronitrile is added to the above composition, it is found that more rapid exposure and curing is possible. Less than equivalent amounts produce similar results but to a lesser degree. When stoichiometric proportions of dimethyl nitrosamine and azobisisobutyronitrile are combined in the above proportions with polyglycidyl methacrylate in dioxane solution and the solution employed as above for producing a photosensitive coating, subsequent irradiation and heating produces a solid coating.

Bases or supports which are suitable for the laminated articles of manufacture of the invention are any material whether fibrous, nonfibrous, stiff or flexible. When a backing is used which is not wet by either the epoxy resin prepolymer or cured polymer, for example, a sheet of polytetrafluoroethylene, a continuous separable sheet of epoxy resin can be prepared. By exposure on such a backing using suitable negatives it is possible to prepare thin shapes of epoxy resin, which can be removed from the support after curing. For example, such shapes can be in the form of spacers or insulators employed in electrical equipment for which purpose epoxy resins are particularly suitable because of their favorable electrical characteristics.

A fibrous backing of paper can be used for a purpose where decorative treatment on one side of the paper is to be produced, the reverse side thereafter being adhered to any desired object. This also provides a means for preparing a stamp bearing indicia such as are commonly used in office practice; or an inexpensive lithographic plate can be produced on a paper support.

A backing of cloth can be employed and stiffening thus provided. For example, a sheet of cloth of a particular color is first coated with sufficient of the solution of Example 2 and dried so that it is of about the stiffness of a quality bond paper. It is exposed through a negative and the image fixed as therein and unexposed portions washed free in acetone. The open areas are then bleached and dyed in a contrasting color and the operation is repeated as often as desired the final exposure setting resin throughout to give decorative stiffened fabric of utility in book binding or for other purposes where the wearing qualities of epoxy resin are desired. By using slightly thicker solutions in the successive impregnations the build-up of exposed resin may be such that a varied surface effect can be produced and by using bolting cloth silk screens can be prepared for printing by the screen process.

Backings of metal are employed as described above in the preparation of printing plates or for protective coatings. Such metals as zinc, copper, magnesium, iron or noble metals can be used. The hardened epoxy resin can serve in these cases as an acid-resist for etching, as in making a printed circuit which is well insulated. A lacquer prepared from a composition of the epoxy resin prepolymers known by the trademark names "Epon 828" and "Epon 1004," and the acid terminated polyester of Example IV, together with about 10 percent of 1,2-bis-(vinylnitrosamino) ethane, in solution in 2-butanone becomes progressively more insoluble on exposure to daylight at ordinary temperatures in the range of about 50° to 100° F. and when fully hardened is a very suitable protective coating for wood exposed to the elements. By use of intense artificial light cure of such a composition is more rapidly initiated, as required under production line conditions. Such liquid mixtures can also be conveniently dispensed in pressurized spray cans.

Backings of various types may be employed where decorative treatment is to be applied by this method, for example to furnish a relief design on plastic or ceramic tile or on glass, the unexposed area in the latter case being optionally etched by hydrofluoric acid or abraded by mechanical means. In some instances the backing is desirably first coated with a primer coating or treated to promote adhesion of the cured epoxy resin. For example, plates having so-called "anchor coatings" as described in U.S. Patent 2,760,863 can be used as backings for both letterpress or lithographic plates. Numerous other methods for priming the backing are possible but are commonly not necessary because of the tenacity with which epoxy resins ordinarily adhere to most surfaces.

A particularly desirable utility is in the preparation of books for the blind which can be made by exposing coatings on thin tough plastic sheets such as polyethylene terephthalate to a negative of the Braille text and fixing and developing as described. The reverse side of each sheet can be coated and "printed" by this method, thus giving a much more compact volume than conventional methods. By using a thin supporting sheet of plastic filled with an ultraviolet absorbing material such as carbon black or iron oxide and bilaterally coated with photosensitized epoxy resins, it is possible to expose the two sides simultaneously thereby increasing the speed of production.

This application is a continuation-in-part of my copending application Serial No. 698,325, filed November 25, 1957, now abandoned.

What is claimed is:

1. A composition of matter comprising, in admixture, an epoxy resin prepolymer and as a latent curing agent therefor an organic compound containing at least one nitrosamino group together with an amount of a free radical initiator at least sufficient to render said nitrosamino group photoactivatable, said latent curing agent having had substantially no exposure to actinic light.

2. A composition of matter comprising, in admixture, an epoxy resin prepolymer and, as a photoactivatable curing agent therefor, an organic compound containing at least one vinylnitrosamino group which has had substantially no exposure to actinic light.

3. As an article of manufacture, a composite laminated sheet comprised of a support and in surface contact therewith an organic solvent-soluble layer of substantially uniform thickness containing, in admixture, an epoxy resin prepolymer and is a latent curing agent therefor an organic compound containing at least one nitrosamino group together with an amount of a free radical initiator at least sufficient to render said nitrosamino group photoactivatable, said latent curing agent having had substantially no exposure to actinic light.

4. As an article of manufacture, a composite, laminated sheet comprised of a support and in surface contact therewith an organic solvent-soluble layer of substantially uniform thickness containing, in admixture, an epoxy resin prepolymer and as a photoactivatable curing agent therefor an organic compound containing at least one vinylnitrosamino group which has had substantially no exposure to actinic light.

5. The process for curing an epoxy resin prepolymer to a hard, organic-solvent insoluble mass which comprises mixing an epoxy resin prepolymer with a latent curing agent which has had substantially no exposure to actinic light comprising an organic compound containing at least one nitrosamino group together with an amount of a free radical initiator at least sufficient to render said nitrosamino group photoactivatable, irradiating said mixture with actinic light, and heating the irradiated mixture at a temperature in the range of about 50° C. to about 150° C.

6. The process for curing an epoxy resin prepolymer to a hard, organic-solvent insoluble mass which comprises mixing an epoxy resin prepolymer with an organic compound containing at least one vinylnitrosamino group which has had substantially no exposure to actinic light, irradiating said mixture with actinic light, and heating the irradiated mixture at a temperature in the range of about 50° C. to about 150° C.

7. A thermoset epoxy resin produced by exposing an epoxy resin prepolymer containing as a photoactivatable curing agent an organic compound containing at least one vinylnitrosamino group which has had substantially no exposure to actinic light, to sufficient actinic radiation to activate said curing agent and subsequently heat-curing said exposed mixture by heating to a temperature in the range of about 50° C. to about 150° C.

8. As an article of manufacture, a composite laminated sheet comprising a support and in contact therewith an adherent, organic solvent-insoluble layer over at least part of the surface of said support, said layer being comprised of a heat-cured epoxy resin produced by the successive steps of exposure to actinic light and heat-curing of a mixture comprising an epoxy resin prepolymer containing substantially uniformly dispersed therein as a photoactivatable curing agent therefor an organic compound containing at least one vinylnitrosamino group which has had substantially no exposure to actinic light.

9. A composition of matter comprising, in admixture, an epoxy resin prepolymer and, as a latent photoactivatable curing catalyst therefor, a nitrosamino group-containing compound selected from the group consisting of compounds represented by the formulae:

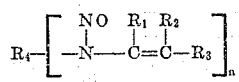

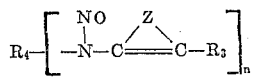

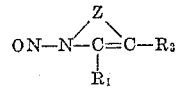

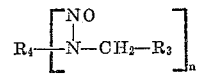

and

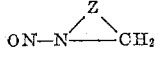

wherein $n$ is an integer from 1 to 2, $R_1$ is a member of the group consisting of hydrogen, alkyl radicals having from 1 to 7 carbon atoms and cycloalkyl radicals having from 5 to 6 carbon atoms, $R_2$ is a member of the group consisting of hydrogen, alkyl and cycloalkyl radicals, $R_3$ is a member of the group consisting of hydrogen, alkyl, cycloalkyl and aryl radicals, and the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, wherein any ethylenic unsaturation is at least 1 carbon atom removed from a valence position, and Z is a divalent alkylene radical comprising the carbon atoms necessary to complete a ring having from 5 to 6 members together with an amount of a free radical initiator at least sufficient to render said nitrosamino group photoactivatable, said latent curing agent having had substantially no exposure to actinic light.

10. A composition of matter which is heat-curable after activation by exposure to actinic light, comprising in admixture an epoxy resin prepolymer and a latent curing agent containing for each mole equivalent of oxirane groups contained in said prepolymer from about 0.01 to about 4 stoichiometric equivalents of nitrosamino group-containing compound selected from the group consisting of compounds represented by the formulae:

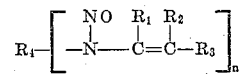

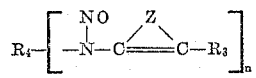

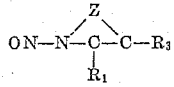

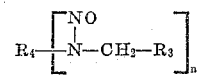

and

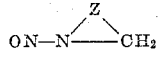

wherein $n$ is an integer from 1 to 2, $R_1$ is a member of the group consisting of hydrogen, alkyl radicals having from 1 to 7 carbon atoms and cycloalkyl radicals having from 5 to 6 carbon atoms, $R_2$ is a member of the group consisting of hydrogen, alkyl and cycloalkyl radicals, $R_3$ is a member of the group consisting of hydrogen, alkyl, cycloalkyl and aryl radicals, and the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, wherein any ethylenic unsaturation is at least 1 carbon atom removed from a valence position, and Z is a divalent radical comprising the carbon atoms necessary to complete a ring having from 5 to 6 members together with an amount of a free radical initiator at least sufficient to render said nitrosamino group photoactivatable, said latent curing agent having had substantially no exposure to actinic light.

11. As an article of manufacture a composite, laminated sheet comprising a support and in contact therewith an adherent organic solvent soluble layer of substantially uniform thickness comprised of, in admixture, an epoxy resin prepolymer and as a latent photoactivatable curing agent therefor nitrosamino group-containing compound selected from the group consisting of compounds represented by the formulae:

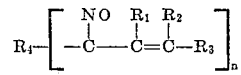

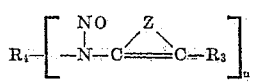

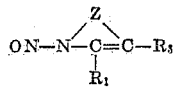

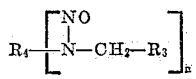

and

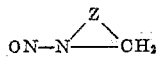

wherein $n$ is an integer from 1 to 2, $R_1$ is a member of the group consisting of hydrogen, alkyl radicals having from 1 to 7 carbon atoms and cycloalkyl radicals having from 5 to 6 carbon atoms, $R_2$ is a member of the group consisting of hydrogen, alkyl and cycloalkyl radicals, $R_3$ is a member of the group consisting of hydrogen, alkyl, cycloalkyl and aryl radicals, and the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, wherein any ethylenic unsaturation is at least 1 carbon atom removed from a valence position, and Z is a divalent radical comprising the carbon atoms necessary to complete a ring having from 5 to 6 members, together with an amount of a free radical initiator at least sufficient to render said nitrosamino group photoactivatable, said latent curing agent having had substantially no exposure to actinic light; and said layer being adapted to be converted to organic solvent insoluble form upon successive irradiation with actinic light and heating.

12. As an article of manufacture a composite, laminated sheet construction comprising a support and in contact therewith an adherent, organic solvent soluble layer of substantially uniform thickness comprised of, in admixture, an epoxy resin prepolymer and a latent curing agent therefor containing for each mole equivalent of oxirane groups contained in said prepolymer from about 0.01 to about 4 stoichiometric equivalents of a nitrosamino group-containing compound selected from the group consisting of compounds represented by the formulae:

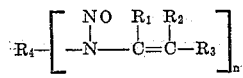

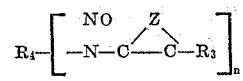

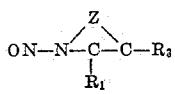

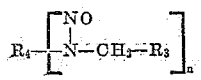

and

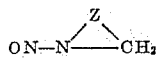

wherein $n$ is an integer from 1 to 2, $R_1$ is a member of the group consisting of hydrogen, alkyl radicals having from 1 to 7 carbon atoms and cycloalkyl radicals having from 5 to 6 carbon atoms, $R_2$ is a member of the group consisting of hydrogen, alkyl and cycloalkyl radicals, $R_3$ is a member of the group consisting of hydrogen, alkyl, cycloalkyl and aryl radicals, and the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, wherein any ethylenic unsaturation is at least 1 carbon atom removed from a valence position, and Z is a divalent radical comprising the carbon atoms necessary to complete a ring having from 5 to 6 members, together with an amount of a free radical initiator at least sufficient to render said nitrosamine group photoactivatable, said latent curing agent having had substantially no exposure to actinic light; said layer being adapted to conversion to organic solvent insoluble form upon successive irradiation with actinic light and heating to a temperature in the range of about 50° C. to 150° C.

13. The process for curing an epoxy resin prepolymer to a hard, organic solvent insoluble mass which comprises mixing an epoxy resin prepolymer with a latent curing agent therefor containing a nitrosamino group-containing compound selected from the group consisting of compounds represented by the formulae:

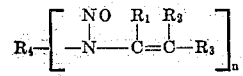

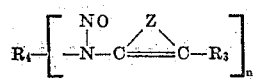

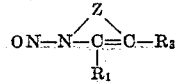

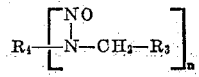

and

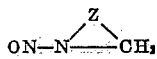

wherein $n$ is an integer from 1 to 2, $R_1$ is a member of the group consisting of hydrogen, alkyl radicals having from 1 to 7 carbon atoms, and cycloalkyl radicals having from 5 to 6 carbon atoms, $R_2$ is a member of the group consisting of hydrogen, alkyl and cycloalkyl radicals, $R_3$ is a member of the group consisting of hydrogen, alkyl, cycloalkyl and aryl radicals, and the sum of carbon atoms in $R_1$, $R_2$ and $R_3$ is not greater than 16, $R_4$ is a radical of the group consisting of alkyl, alkenyl, aralkyl, cycloalkyl, alkylene, aralkylene and cycloalkylene radicals, wherein any ethylenic unsaturation is at least 1 carbon atom removed from a valence position, and Z is a divalent radical comprising the carbon atoms necessary to complete a ring having from 5 to 6 members, together with an amount of a free radical initiator at least sufficient to render said nitrosamino group photoactivatable, said latent curing agent having had substantially no exposure to actinic light; subjecting said mixture to the action of actinic light and heating the irradiated mixture to a temperature in the range of about 50° C. to 150° C.

14. A composition of matter comprising, in admixture, an epoxy resin prepolymer and, as a photoactivatable curing agent therefor, an organic compound containing at least one vinylnitrosamino group which has had substantially no exposure to actinic light, together with a free radical initiator sufficient in amount to increase the light and heat-sensitivity of the system.

15. A composition of matter which is heat-curable after exposure to actinic light, comprising in admixture an epoxy resin prepolymer and methylvinylnitrosamine which has had substantially no exposure to actinic light.

16. A composition of matter which is heat-curable after exposure to actinic light, comprising in admixture an epoxy resin prepolymer and 1,2-bis(vinylnitrosamino)ethane which has had substantially no exposure to actinic light.

17. A composition of matter which is heat-curable after exposure to actinic light, comprising in admixture an epoxy resin prepolymer and allyl propenylnitrosamine which has had substantially no exposure to actinic light.

18. A composition of matter comprising, in admixture, an epoxy resin prepolymer and, as a photoactivatable curing agent therefor, about 0.01 to about 4 stoichiometric equivalents of an organic compound containing at least one vinylnitrosamino group which has had substantially no exposure to actinic light, for each mole equivalent of oxirane groups contained in the said prepolymer.

19. As an article of manufacture, a composite, laminated sheet comprised of a support having in face to face surface contact therewith an organic solvent-soluble layer of substantially uniform thickness comprised of, in admixture, an epoxy resin prepolymer and for each mole equivalent of oxirane groups contained in the said prepolymer, as a photoactivatable curing agent therefor, about 0.01 to about 4 stoichiometric equivalents of an organic compound containing at least one vinylnitrosamino group which has substantially no exposure to actinic light.

20. A composition which is heat-curable after exposure to actinic light, comprising in admixture an epoxy resin prepolymer and a latent curing agent therefor containing dimethylnitrosamine together with an amount of a free radical initiator sufficient to render the said dimethylnitrosamine photoactivatable, said curing agent having had substantially no exposure to actinic light.

References Cited in the file of this patent

UNITED STATES PATENTS

| | | |
|---|---|---|
| 2,585,115 | Greenlee | Feb. 12, 1952 |
| 2,627,526 | Du Brow et al. | Feb. 2, 1953 |
| 2,816,926 | Smiley | Dec. 17, 1957 |